United States Patent [19]

Etherton et al.

[11] Patent Number: 5,504,171
[45] Date of Patent: Apr. 2, 1996

[54] UNSATURATED PROPYLENE/α, ω-DIENE COPOLYMERS

[75] Inventors: Bradley P. Etherton; James J. McAlpin, both of Houston; Terrence Huff, Baytown, all of Tex.; Edward N. Kresge, Watchung, N.J.

[73] Assignee: Exxon Chemical Patent Inc., Wilmington, Del.

[21] Appl. No.: 363,206

[22] Filed: Dec. 22, 1994

Related U.S. Application Data

[63] Continuation of Ser. No. 519,616, May 7, 1990, abandoned.

[51] Int. Cl.$^6$ .............................. C08F 236/20; C08F 2/02
[52] U.S. Cl. .................... 526/336; 526/128; 526/339; 526/902; 526/123.1; 522/158
[58] Field of Search ........................ 526/336, 339, 526/125, 902

[56] References Cited

U.S. PATENT DOCUMENTS

| | | | |
|---|---|---|---|
| 2,933,480 | 4/1960 | Gresham et al. | 260/80.5 |
| 3,351,621 | 11/1967 | Bacskai/Chevron | 526/336 |
| 3,480,599 | 11/1969 | Park | 260/80.7 |
| 3,658,770 | 4/1972 | Longi et al. | 260/79.5 |
| 3,984,610 | 10/1976 | Elston | 526/281 X |
| 3,991,262 | 11/1976 | Lal et al. | 526/336 |
| 4,340,705 | 7/1982 | Lal et al. | 526/139 |
| 4,366,296 | 12/1982 | Kitagawa et al. | 526/77 |
| 4,551,503 | 11/1985 | Lal et al. | 525/332.1 |
| 4,868,264 | 9/1989 | Evens et al. | 526/336 |
| 4,999,409 | 3/1991 | Doi et al. | 526/336 X |

FOREIGN PATENT DOCUMENTS

| | | |
|---|---|---|
| 0219166 | 4/1987 | European Pat. Off. |
| 0317240 | 5/1989 | European Pat. Off. |

OTHER PUBLICATIONS

Briston, Plastic Films, J. Wiley and Sons, N.Y., 103–105 (1974).
Chemical Abstracts; Macromolecular Sections; vol. 71, No. 5, 8 Sep. 1969.

*Primary Examiner*—Fred Teskin
*Attorney, Agent, or Firm*—Myron B. Kurtzman; Douglas W. Miller

[57] ABSTRACT

Disclosed are unsaturated α-olefin/α,ω-diene copolymers, and a method of preparation thereof. The copolymers are generally crystalline, free of gel and cross-links, and contain unsaturated side chains and long chain branching. The copolymers contain up to 5 mole percent diene incorporated therein, and may be prepared by copolymerization using a solid-phase, insoluble coordination catalyst, without a solvent, and below the crystalline melting point of the copolymer.

24 Claims, No Drawings

UNSATURATED PROPYLENE/α, ω -DIENE COPOLYMERS

The present application is a continuation of U.S. Ser. No. 07/519,616, filed May 7, 1990, now abandoned.

FIELD OF THE INVENTION

This invention relates to copolymers of α-olefins and α,ω-dienes, and a method for their preparation. More particularly, the invention relates to crystalline, gel-free, long chain branched and unsaturated α-olefin/α,ω-diene copolymers and their preparation.

RELEVANT ART

Selected dienes have been copolymerized with α-olefins in order to introduce unsaturation into the polymer as a site for chemical reactions such as crosslinking. In U.S. Pat. No. 3,658,770 to Longi et al, it is taught that these dienes should be non-conjugated and should have two different kinds of double bonds, the first double bond being copolymerizable with the α-olefin and the second double bond being nonco-polymerizable by Ziegler-type catalysts. Thus, useful classes of dienes for introduction of unsaturation into ethylene-propylene terpolymers are straight-chain and branched-chain acyclic dienes, single ring alicyclic dienes, and multi-ring alicyclic and bridged ring dienes, wherein one of the double bonds will copolymerize while the second is inert to the catalyst. Such useful dienes are 1,4-hexadiene, dicyclopentadiene and 5-ethylidene-2-norbornene.

The copolymerization of branched 1,4-dienes with ethylene, propylene or 4-methyl-1-pentene is similarly described in U.S. Pat. No. 4,366,296 to Kitigawa et al. While the copolymerization of propylene with α,ω-dienes of at least 6 carbon atoms using a Ziegler type catalyst in a hydrocarbon diluent is taught in U.S. Pat. No. 3,351,621 to Bacskai, the copolymerization has invariably led to a copolymer insoluble in hot decahydronaphthalene, indicative of the presence of cross-links and gel.

U.S. Pat. No. 2,933,480 to Gresham et al, discloses the copolymerization of α-olefins and diolefins in which both double bonds are terminal to obtain an elastomeric (non-crystalline) interpolymer. From U.S. Pat. Nos. 4,551,503; 4,340,705; and 3,991,262, all to Lal et al, it is known to prepare interpolymers of $C_4$-$C_{12}$ α-olefins with $C_8$-$C_{36}$ α,ω-dienes using a Ziegler-type catalyst specially treated with hexaalkyl phosphoric triamides or organophosphate esters. However, the interpolymers taught in these patents are also elastomers, and not crystalline thermoplastics.

U.S. Pat. No. 3,480,599 to Park discloses elastomers made by copolymerizing trienes with α-olefins.

As far as applicants are aware, there is no prior art teaching crystalline copolymers of α-olefins such as propylene with α,ω-diene, wherein the copolymer is essentially gel-free and contains residual reactive unsaturation. Nor are applicants aware of any prior art teaching the copolymerization of α-olefins and α,ω-dienes to produce a crystalline, gel-free copolymer, wherein the copolymerization is effected without a diluent, below the glass transition temperature of the copolymer product, and using a solid heterogeneous catalyst.

SUMMARY OF THE INVENTION

It has been discovered that dienes having two Ziegler-polymerizable double bonds can be copolymerized with α-olefins to obtain a crystalline structure without extensive gel formation if the copolymerization is effected with a Ziegler-type catalyst having an immobile or insoluble catalyst site under conditions for rapidly immobilizing the polymer chain. Immobile catalyst sites are, for example, those on the face of crystals, or on surfaces of solid-supported catalyst. The growing polymer chains may be immobilized by crystallization and/or by copolymerizing near or below the glass transition temperature of the polymer.

In one aspect, the invention provides a method of preparing a gel-free, unsaturated copolymer of an α-olefin and an α,ω-diene. The method comprises charging to a reaction zone α-olefin having from 2 to about 12 carbon atoms, α,ω-diene having from 7 to about 30 carbon atoms, and solid heterogeneous coordination catalyst. The method also includes maintaining the reaction zone essentially free of solvent and at a temperature at which the α-olefin is fluid but below the crystalline melting point of the copolymer, effective to produce an essentially gel-free copolymer with unsaturation.

In another aspect, the invention provides an unsaturated crystalline α-olefin copolymer. The copolymer comprises α-olefin interpolymerized with from 0.01 to 5 mole percent of an α,ω-diene having from 7 to about 30 carbon atoms to produce an unsaturated crystalline copolymer essentially free of gel. The copolymer of this invention incorporates the α,ω-diene comonomer in two different ways. First, one end of the diene comonomer may be reacted in the α-olefin backbone leaving the other end unreacted to provide unsaturated side chains. Second, the other end of the diene comonomer may react with additional monomer to provide long side chain branches greater in length than the α,ω-diene, in a fashion analogous to the branching in low density polyethylene (LDPE) which is also sometimes referred to as branched polyethylene or high pressure polyethylene. The predomination of either manner of diene comonomer incorporation can be effected by the selection of catalyst and polymerization conditions, and the copolymer properties tailored accordingly. The side chain unsaturation, for example, imparts gamma radiation stability and reactive functional sites for chemical modification, whereas long chain branching imparts greater melt strength and elasticity to facilitate processing the copolymer in heretofore difficult polypropylene applications such as, for example, blow molding, stretch blow molding, extrusion into pipe, extrusion coating, and high temperature flexural modulus retention. Surprisingly, however, the α-olefin-α,ω-diene copolymer is free of xylene-insoluble gel, regardless of which type of diene incorporation predominates.

DETAILED DESCRIPTION OF THE INVENTION

The present invention involves the reaction of an α-olefin with an α,ω-diene. Suitable α-olefins include, for example, ethylene, propylene, butene-1, pentene-1, hexene-1, heptene-1, 4-methyl-1-pentene, 4-methyl-1-hexene, 5-methyl-1-hexene, 1-octene, 1-decene, 1-undecene, 1-dodecene and the like. Of these, ethylene, propylene, butene-1, pentene-1, and 4-methyl-1-pentene are preferred, and propylene is particularly preferred. In addition, mixtures of these α-olefins which result in crystalline polymers may also be used, such as, for example, propylene and a minor proportion of ethylene. The invention is described below with reference to propylene as an example of the α-olefin for the sake of brevity and clarity with the understanding that other α-olefins are also contemplated.

Suitable α,ω-dienes contain at least 7 carbon atoms and have up to about 30 carbon atoms, with from 8 to 12 carbon atoms being preferred. Representative examples of such α,ω-dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and the like. Of these, 1,7-octadiene, and 1,9-decadiene are preferred, particularly 1,9-decadiene.

The α,ω-diene may comprise from about 0.01 to about 5 mole percent of the copolymer, preferably from about 0.05 to about 2 mole percent, and especially from about 0.1 to 1 mole percent. The diene content can be estimated, for example, by measuring absorbance at 722 cm$^{-1}$ using infrared spectroscopy. Depending upon the catalyst, polymerization conditions and comonomer selection, the copolymer may incorporate unsaturated comonomer side chains comprising from about 0.001 to about 5 mole percent of the copolymer, preferably from about 0.01 to about 2 mole percent, and especially from about 0.1 to about 1 mole percent.

In sharp contrast to the prior art diene copolymers, however, the present copolymer is essentially gel-free and generally crystalline. The absence of gel and cross-links in the present copolymer is evidenced by, for example, very low (less than 0.1 weight percent) or undetectable xylene-insoluble fractions. Also, the high crystallinity of the present copolymers is evidenced by a relatively high hot n-heptane insolubles (HI) fraction, preferably at least 80 weight percent up to as much as 95 weight percent or more. Further, the present copolymers are branched and may have a branching index from about 0.2 to about 0.9, preferably from 0.6 to 0.8. As used herein, the branching index is defined as the ratio of the intrinsic viscosity of the α,ω-diene-α-olefin copolymer to the intrinsic viscosity of the poly-α-olefin homopolymer having the same molecular weight distribution as the copolymer. The copolymer may have any molecular weight suitable for its intended end use, and in the case of polypropylene copolymers, preferably has a melt flow rate (MFR) of from about 0.01 to about 2000, more preferably from about 0.1 to about 300 and especially from about 0.5 to about 70. As used herein, MFR is determined according to ASTM D-1238, condition L (2.16 kg, 230° C).

α,ω-Diene-α-olefin copolymers are prepared according to the method of the invention by interpolymerizing the α-olefin and the diene under conditions in which the catalyst site remains relatively insoluble and/or immobile so that the polymer chains are rapidly immobilized following their formation. Cross-link formation through the unsaturation remaining at the free-end of the branch chain resulting from incorporation of the diene into the copolymer is thus inhibited by rapidly immobilizing the otherwise reactive unsaturation site. Such immobilization is effected, for example, by (1) using a solid, insoluble catalyst, (2) conducting the copolymerization in a medium in which the resulting copolymer is generally insoluble, and (3) maintaining the polymerization reactants and products below the crystalline melting point of the copolymer.

Catalysts suitable in the method of the present invention include solid, heterogeneous coordination catalysts, such as Ziegler-type catalysts. An insoluble or otherwise solid-phase catalyst is essential to obtain a gel-free product. Soluble catalysts, such as, for example, the biscyclopentadienyltitanium(IV) dichloride-aluminum alkyl system, are generally unsuitable because the second terminal bond of the α,ω-diene is not protected from the catalyst and remains available for reaction in a gel-forming polymerization reaction. Heterogeneous catalysts capable of producing stereo-regular polymers are also preferred, and particularly those catalysts suitable for the preparation of insoluble, isotactic polypropylene. Titanium catalyst containing a minor amount of prepolymerized α-olefin and solid-supported titanium catalysts are particularly preferred. Prepolymerized activated titanium catalyst is described in U.S. Pat. No. 4,295,991 to Wristers which is hereby incorporated herein by reference. Briefly, the prepolymerized activated titanium catalyst is obtained by reducing titanium trichloride with an organoaluminum compound at low temperatures, treating the resulting reduced solid product with about 1-1000 weight percent α-olefin, and activating the resulting prepolymerized solid with a halogenated hydrocarbon and a Lewis base complexing agent or titanium tetrachloride and a Lewis base complexing agent. The prepolymerized activated titanium catalyst may be employed in combination with an organometal compound.

Specific examples of supported titanium catalysts include: (1) a catalytic solid powder obtained by copulverizing a magnesium compound such as magnesium chloride in an electron donor such as aromatic carboxylic esters or by reacting these compounds optionally in the presence of an inert solvent, and then co-pulverizing the resulting product together with a titanium compound; (2) a pulverulent solid obtained by reacting a reaction product of a titanium compound and an electron donor with a magnesium compound by co-pulverizing the compounds; (3) a pulverulent solid obtained by reacting a magnesium compound, an electron donor and a titanium compound together through the simultaneous co-pulverization of these compounds; (4) a product obtained by supporting titanium tetrachloride on a co-pulverized product of a solid reaction product [(hereinafter referred to as a support (I)] of magnesium hydroxychloride and ethylaluminum dichloride and an aromatic carboxylic acid ester; (5) a product obtained by co-pulverizing the support (I) and a complex of an aromatic carboxylic acid ester and titanium tetrachloride; (6) a product obtained by treating the co-pulverized product obtained in (5) in a halogenated hydrocarbon with halide such as halogen, interhalogen compound, sulfur monochloride, sulfur dichloride or phosphorous pentachloride; (7) a product obtained by treating a copulverized product of the support (I) and an aromatic acyl halide with titanium tetrachloride and ethers or an alkoxy compound; (8) a product obtained by treating a copulverized product of the support (I) and an alkoxysilane with titanium tetrachloride and phosphates or phosphites; (9) a product obtained by subjecting a solid product [a support (II)] obtained by reacting the support (I) with a siloxane compound, instead of the support (I), to any procedure described in (4) through (8); (10) a product obtained by using substantially anhydrous magnesium chloride [a support (III)], instead of the support (I), in any procedure described in (4) through (8); (11) a product obtained by adding a halide such as silicon tetrachloride, aluminum trichloride, phosphorus pentachloride, antimony trichloride and tellurium tetrachloride, for example, during the co-pulverization in any procedure described in (4) through (8); (12) a product obtained by adding a siloxyaluminum compound such as trimethylsiloxyaluminumdichloride during the co-pulverization in any procedure described in (4)through (10); (13) a product obtained by adding siloxane compound during the co-pulverization in any procedure described in (4) through (10); (14) a solid obtained by reacting the reaction product of a Grignard compound and a compound containing a Si—H bond, alcohols or phenols, siloxanes, with a compound containing a Si-halogen bond, reacting the resulting solid [a support (IV)] with titanium tetrachloride, and finally reacting the resulting product with a carboxylic acid ester; (15) a solid powder obtained by treating a reaction product of magnesium oxychloride and ethylaluminumdichloride with a polysiloxane, and reacting the resulting product with an alcohol and diethylaluminumchloride in the order described, and finally reacting the resulting product with titanium tetrachloride; (16) a solid powder obtained by reacting magnesium chloride pulverized in a ball mill with an alkyl titanate and then reacting the resulting product with titanium tetrachloride and methyl hydrogen polysiloxane; (17) a solid powder obtained by treating a co-pulverized product of magnesium chloride and ethoxytrichlorotitanium with iodine trichloride in a halogenated hydrocarbon; (18) a solid powder obtained by using magnesium chloride in the procedure described in (15) instead of a compound obtained by treating a reaction product of magnesium oxychloride and ethylaluminum dichloride with a polysiloxane; (19) a solid powder obtained by using a reaction product of magnesium oxychloride and ethylaluminum dichloride in the procedure described in (16), instead of magnesium chloride; and the like. Additional examples of solid supported catalysts are described in U.S. Pat. No. 4,366,296 which is hereby incorporated herein by reference.

As mentioned above, the selection of catalyst can be used to favor the formation of side chain unsaturation or long chain branching. Generally, the prepolymerized catalyst has been found to favor more side chain unsaturation, while the magnesium chloride-supported catalysts tend to favor more long chain branching.

The copolymerization is effected in gas or liquid phase, and in the case of propylene, preferably as a slurry in liquid propylene. The copolymerization should be in the essential absence of a solvent, which commonly include pentane, hexane, heptane, octane, branched alkanes such as those sold under the trade designation Isopar or the like. Such solvents tend to adversely affect the copolymer by permitting crosslinking and gel formation to occur which is believed to result from the solubility of the copolymer therein and the ability of the side-chain unsaturation to participate in a dissolved state in subsequent crosslinking polymerizations. Nonetheless, a very minor proportion of solvent, or a diluent by which the copolymer is not swollen, may permissibly be present in the reactor, e.g. the catalyst may be introduced to the reactor in such a solvent, without significant adverse effects.

The copolymerization reactor temperature must be maintained below the crystalline melting point of the propylene copolymer to facilitate inhibiting the mobility of the unsaturated side chain in participation in additional polymerization reactions which cross-link the polymer to form xylene-insoluble gel. The crystalline melting point of the copolymer is usually in the range of about 155°–165° C. The reactor is preferably maintained at from 0° to 100° C., and especially from 30° to 70° C.

In preparing the copolymer, the propylene and α,ω-diene are charged to a suitable reactor vessel with the catalyst. Generally, the propylene in gas or liquid form comprises the bulk of the reactor contents and the diene comonomer(s) may comprise from about 0,001 to about 20 weight percent. If the proportion of diene comonomer feed is too low, insufficient comonomer is incorporated in the resultant copolymer. With an excessive diene comonomer proportion, however, the comonomer can begin to function as a diluent or solvent for the copolymer and gel formation can result. Preferably, the reactor charge comprises from about 0.01 to about 20 weight percent of the diene comonomer, especially from about 0.1 to about 10 weight percent.

The reactor charge may also include hydrogen for controlling molecular weight and improving catalyst activity. The hydrogen concentration may be as high as 10 mole percent, preferably from about 0.01 to about 5 mole percent, and especially from 1 to 2 mole percent. In general, the more hydrogen present in the reaction zone, the lower the molecular weight and the greater the catalyst activity. Catalyst is generally fed to the reactor in suitable amounts to obtain the desired copolymer production. The reactor may be operated continuously, batch or semi-batch, at a suitable pressure, usually from about 50 to about 2000 psig, preferably from about 100 to about 700 psig, and more preferably from about 300 to about 600 psig.

It is contemplated that the copolymer of the present invention may be used as a reactive feed for subsequent polymerization reactors, such as, for example, the ethylene-propylene rubber reactor in a polypropylene impact copolymer process.

The copolymer is recovered from the reactor and separated from unreacted monomer in a conventional manner. Because of its novel structure, a wide variety of end-use applications are contemplated. The sidechain unsaturation imparts stability to the copolymer not possessed by homopolypropylene. For example, the propylene-diene copolymer suffers no molecular weight loss (increased melt flow rate) and forms gel when treated with peroxide free radical initiators, or when exposed to gamma radiation, whereas conventional polypropylene rapidly degrades through a molecular chain scission mechanism and does not form gel. Thus, the present copolymer may be grafted with vinyl monomers such as maleic anhydride using peroxide initiators, or exposed to gamma radiation. This later application is particularly attractive in medical devices and structures made from or containing the present copolymer, e.g. syringes, trays and the like, wherein gamma radiation, typically 2.5–10 MRads, is used for sterilization purposes. Indeed, such radiation serves to cross-link the present propylene copolymer via the unsaturation in the side chains, conferring additional dimensional stability on the medical device or other product.

The α,ω-diene-propylene copolymer also has enhanced processability owing to the presence of the long chain branching, in much the same manner that branched polyethylene is known to be easier to process than linear polyethylenes. For example, in food packaging applications wherein the polypropylene container is retorted, e.g. a bottle or dish, the propylene-diene copolymer is easily blow molded or stretch blow molded, whereas conventional polypropylene has such poor melt strength that thin, non-uniform walls are usually obtained in the molded products.

In pipe fabrication, the present propylene-diene copolymers have better processability then conventional polypropylene of equivalent melt flow rate. The copolymer has a lower melt viscosity at a given shear rate because of the long side chains, allowing higher throughput and less sag at the extruder die. Also, the copolymer can be extrusion coated with less neck-in than conventional polypropylene, avoiding the necessity of blending with low density polyethylene as is conventionally done with the propylene homopolymer, and avoiding the concomitantly reduced maximum use temperatures. Moreover, the α,ω-diene-propylene copolymers retain flexural modulus better than conventional polypropylene, allowing the use of the copolymer at higher temperatures in structural applications where the prior art polypropylene would be unsatisfactory.

In the examples that follow, the catalysts are designated as follows: "catalyst I" is prepolymerized $TiCl_3$ catalyst prepared in accordance with the description in Example 10 of U.S. Pat. No. 4,295,991; and "catalyst II" is prepolymerized MgCl$_2$-supported alkoxysilane-modified TiCl$_4$ catalyst using triethylaluminum as a cocatalyst, wherein the catalyst is obtained from Mutsui Petrochemical Company under the trade designation SP-101. 1,9-Decadiene from Shell International Chemicals was purified by passage over a column of basic alumina (Baker, Brockman activity 5). The column was 1 inch in diameter and 10 inches high. The diene was collected over activated 4 Å molecular sieves and sparged with nitrogen for 1 hour in order to remove air and water.

1,9-Decadiene contents of the propylene copolymers were measured by infrared spectroscopy. One gram of the copolymer sample was dissolved in 100 ml of xylene. The copolymer-xylene solution was then poured into 500 ml of cold isopropanol. The resulting slurry was filtered and the solid dried under vacuum for 16 hours at 70° C. A 10 mil pad was compression molded at 190° C. and this plaque was used for the infrared measurements. Unsaturation in the side chains was determined by measuring the absorbance at 1640 cm$^{-1}$ and the sample thickness and applying the equation:

$$X_{unsat}=kA_{1640}/\delta$$

wherein $X_{unsat}$ is the weight percent of unsaturated diene comonomer on the copolymer, k is a constant, $A_{1640}$ is absorbance at 1640 cm$^{-1}$ and $\delta$ is the sample thickness in mm. The total amount of 1,9-decadiene incorporated into the copolymer was also determined by infrared spectroscopy. This was calculated by measuring the absorbance at 722 cm$^{-1}$ and the sample thickness and applying the equation:

$$X_{diene}=kA_{722}/\delta$$

wherein $X_{diene}$ is the weight percent of diene comonomer in the copolymer, $A_{722}$ is the absorbance at 722 cm$^{-1}$ and k and $\delta$ are as above. The amount of 1,9-decadiene bridging between two polymer chains was determined by subtracting the amount with terminal unsaturation from the total 1,9-decadiene content. The unsaturation content of the polymer was also determined in some cases by high temperature proton nuclear magnetic resonance spectroscopy of the sample dissolved in tetrachloroethane. The mole percentage unsaturation was calculated using the following equation:

$$Y_{unsat}=100 \, [2A/(B-3A)]$$

wherein $Y_{unsat}$ is the unsaturated diene mole percentage of the sample, A is the integral of the spectrum from 5 to 6 ppm (olefinic region) and B is the integral of the spectrum from 0 to 2 ppm (aliphatic region).

The average molecular weight of the polymers was determined by gel permeation chromatography (GPC). The number of long side chains/molecule for a given weight average molecular weight was then calculated from the number of bridges and the weight average molecular weight.

The melt flow rate (MFR) of the sample was determined by ASTM D-1238, condition L (2.16 kg, 230° C.). The heptane insolubles (HI) were determined by measuring the fraction of polymer which remained in an extraction thimble following extraction with refluxing heptane in a Soxhlet extractor under nitrogen for 24 hours. The melting point (MP) was determined by differential scanning calorimetry, based on a second melt. Both the heating and cooling rates were 10° C./min.

COPOLYMER PREPARATION AND PROPERTIES

Example 1

A dry, nitrogen-blanketed two-liter autoclave was charged with 100 ml of 1,9-decadiene; 4 ml of 1 M triethylaluminum; 4 ml of 0.1 M alkoxy silane catalyst modifier; hydrogen to 110 psig; and 1250 ml of liquid propylene. The autoclave was continuously stirred and heated to 60° C. Two hundred mg of catalyst I was pressured into the autoclave and polymerization allowed to proceed at 70° C. for 1.5 hours. The autoclave was then vented and cooled, and a granular polymer was recovered. The product was placed in a vacuum oven (50° C., 20 mm Hg) overnight. The dried polymer product weighed 261 g. Proton nuclear magnetic resonance spectrometry showed 0.55 mole percent unsaturation, in contrast to polypropylene similarly prepared which contains no measurable unsaturation.

Example 2

Propylene/1,9-decadiene copolymers were produced in two 150 gallon stirred tanks, operated in series, as a reactor. Catalyst I was used. The conditions in the two reactors were as follows:

|  | REACTOR 1 | REACTOR 2 |
|---|---|---|
| Reaction Temperature (°F.) | 169.8 | 159.3 |
| Propylene Flow Rate (lb/hr) | 109.9 | 50.0 |
| 1,9-Decadiene Flow Rate (lb/hr) | 5.3 | 2.4 |
| Gas Phase H$_2$ Concentration (mole %) | 3.0 | 3.3 |
| Solids Concentration (wt %) | 29.9 | 30.2 |

Sufficient catalyst was fed to produce polymer at a rate of 50.6 lb/hr. Sufficient 15% diethylaluminum chloride (DEAC) in hexane was fed to maintain an Al/Ti ratio of 6.0. The product had a MFR of 27.5 dg/min and an HI of 87.5%. It contained 4.4 ppm Ti. The copolymer had a melting point of 156.6° C. and contained 0.30 mole percent 1,9 decadiene unsaturation and 0.50 mole percent total 1,9-decadiene. GPC measurement of the molecular weight distribution in this product gave an $M_w$=186,700 and $M_2/M_n$=5.26. The measured intrinsic viscosity of the sample was 0.833. The intrinsic viscosity calculated from the GPC data was 1.235. This gave a branching index of 0.674. This demonstrates that significant branching was present in the copolymer granules from the polymerization reactor. However, the sample contained no gel and was completely soluble in refluxing xylene. The effect of branching was also evident from recoverable compliance measurements of the polymer. The recoverable compliance at 180° C. was 6.26×10$^{-5}$ cm$^2$/dyne. Samples of the polymer were injection molded into 125 mil thick bars and subjected to gamma radiation at 1 and 5 MRad dosages. Before irradiation, the gel content was 0%. After irradiation at 1 MRad and 5 MRads, the gel contents were 3% and 34%, respectively. The MFR was also measured on ground injection molded bars, before and after irradiation. Before irradiation, the MFR was 38 dg/min. After irradiation at 1 MRad and 5 MRads, the MFR's were 31 and 2.6 dg/min, respectively. These experiments show that the molecular weight increased due to cross-linking of the polymer after exposure to radiation, in contrast to propylene homopolymers which exhibit severe molecular weight loss with such gamma radiation exposures.

Example 3

Propylene/1,9-decadiene copolymers were produced in the same reactor as described in Example 2. Catalyst system I was used. The conditions in the two reactors were as follows:

|  | REACTOR 1 | REACTOR 2 |
| --- | --- | --- |
| Reaction Temperature (°F.) | 169.8 | 160.2 |
| Propylene Flow Rate (lb/hr) | 110.0 | 50.0 |
| 1,9-Decadiene Flow Rate (lb/hr) | 7.9 | 3.6 |
| Gas Phase $H_2$ Concentration (mole %) | 1.5 | 1.7 |
| Solids Concentration (wt %) | 33.6 | 33.1 |

Sufficient catalyst was fed to produce polymer at a rate of 56.7 lb/hr. Sufficient 15% DEAC in hexane was fed to maintain an Al/Ti ratio of 4.7. The product had a MFR of 4.2 dg/min and an HI of 90.0%. It contained 7.2 ppm Ti. The polymer had a melting point of 157.9° C. and contained 0.10 mole % 1,9-decadiene unsaturation and 0.50 mole percent total 1,9-decadiene. GPC measurement of the molecular weight distribution in this product gave a weight average molecular weight ($M_w$) of 250,000 and ratio of number average molecular weight ($M_n$) to $M_w$ of 5.40. The intrinsic viscosity of the sample was 1.114. The intrinsic viscosity calculated from the GPC data was 1.580. This gave a branching index of 0.705. Significant branching was present in the polymer granules from the polymerization reactor. The gel content of the sample was 0.0%. The recoverable compliance at 180° C. was $6.56 \times 10^{-5}$ cm$^2$/dyne. Samples of the polymer were injection molded into 125 mil thick bars and subjected to gamma radiation. Before irradiation, the gel content was 0%. After irradiation at 1 MRad and 5 MRads, the gel contents were 19% and 43%, respectively. The MFR was measured on ground injection molded bars, before and after irradiation. Before irradiation, the MFR was 8 dg/min. After irradiation at 1 MRad, the MFR was 2 dg/min. After exposure to 5 MRads of radiation, the sample MFR could not be measured since it would not flow through an orifice. These experiments show that the molecular weight increased due to cross-linking of the polymer after exposure to radiation.

Example 4

Propylene/1,9-decadiene copolymers were produced in the same reactor as described in Example 2. Catalyst system I was used. The conditions in the two reactors were as follows:

|  | REACTOR 1 | REACTOR 2 |
| --- | --- | --- |
| Reaction Temperature (°F.) | 169.8 | 159.4 |
| Propylene Flow Rate (lb/hr) | 110.0 | 50.0 |
| 1,9-Decadiene Flow Rate (lb/hr) | 7.2 | 3.3 |
| Gas Phase $H_2$ Concentration (mole %) | 1.8 | 1.9 |
| Solids Concentration (wt %) | 30.6 | 33.4 |

Sufficient catalyst was fed to produce polymer at a rate of 56.9 lb/hr. Sufficient 15% DEAC in hexane was fed to maintain an Al/Ti ratio of 4.7. The product had a MFR of 7.0 dg/min and an HI of 89.0%. It contained 6.8 ppm Ti. The polymer had a melting point of 158.1° C. and contained 0.10 mole percent 1,9-decadiene unsaturation and 0.50 mole percent total 1,9-decadiene.

Comparative Example 1

A commercial propylene homopolymer with an MFR of 1.6 dg/min was irradiated at different dosages to demonstrate the degradation that results when propylene homopolymers are subjected to gamma radiation. The samples were injection molded into 125 mil Izod impact bars and subjected to gamma radiation. After 2.1 MRads the MFR increased to 8 dg/min, at 5.6 MRads the MFR increased to 20 dg/min, and after 10.6 MRads the MFR was 78 dg/min. No cross-linking was observed.

Comparative Example 2

A propylene/hexene copolymer with an MFR of 2.5 dg/min was irradiated at different dosages to demonstrate that severe degradation results when propylene copolymers with other α-olefins are subject to gamma radiation. After 2.1 MRads the MFR increased to 10 dg/min. and at 5.6 MRads the MFR increased to 39 dg/min.

Comparative Example 3

A propylene homopolymer with a MFR of 15 dg/min was irradiated at different dosages to demonstrate the degradation that results when propylene homopolymers are subjected to gamma radiation. The samples were injection molded into 125 mil Izod impact bars and subjected to gamma radiation. Before irradiation the gel content of the sample was 0.0%. After irradiation at 2.1 MRads, 5.6 MRads, and 10.6 MRads the gel content was 0.0%. No cross-linking was observed.

Comparative Example 4

This example demonstrates the low recoverable compliance that is observed for polypropylene homopolymers. The recoverable compliance of a homopolymer having a MFR of 8 dg/min was measured at 180° C. The recoverable compliance was $2.80 \times 10^{-5}$ cm$^2$/dyne. This demonstrates the lower elasticity of the melt for a linear homopolymer.

The foregoing description of the invention is illustrative and explanatory only. Various modifications will occur to the skilled artisan in view thereof. All such variations which are within the scope or spirit of the appended claims are intended to be embraced thereby.

We claim:

1. A propylene/α,ω-diene copolymer, comprising:
   propylene interpolymerized with from 0.01 to 5 mole percent of an α,ω-diene having from 7 to about 30 carbon atoms, to produce an unsaturated crystalline copolymer essentially free of gel, and wherein said copolymer has greater than about 80 weight percent heptane insolubles.

2. The copolymer of claim 1, comprising from about 0.05 to about 2 mole percent of said α,ω-diene.

3. The copolymer of claim 1, comprising from about 0.001 to about 5 mole percent of unsaturated side chains.

4. The copolymer of claim 1, wherein the α,ω-diene has from 8 to 12 carbon atoms.

5. The propylene/α,ω-diene copolymer of claim 1 wherein said copolymer has a branching index of from about 0.2 to about 0.9.

6. The propylene/α,ω-diene copolymer of claim 1 wherein said copolymer has a branching index of from about 0.6 to about 0.8.

7. The propylene/α,ω-diene copolymer of claim 1 wherein said copolymer includes from about 0.001 to about 2 mole percent unsaturated side chains.

8. The propylene/α,ω-diene copolymer of claim 1 wherein said copolymer includes from about 0.01 to about 2 mole percent unsaturated side chains.

9. The propylene/α,ω-diene copolymer of claim 1 wherein said copolymer includes from about 0.1 to about 1 mole percent unsaturated side chains.

10. An unsaturated propylene/α,ω-diene copolymer, comprising:

propylene interpolymerized with from 0.01 to 5 mole percent of an α,ω-diene having from 8 to 12 carbon atoms, wherein the copolymer contains unsaturated side chains, and is essentially free of gel and wherein said copolymer has greater than about 80 weight percent heptane insolubles.

11. The copolymer of claim 10, wherein said copolymer comprises from about 0.05 to about 2 mole percent of said α,ω-diene.

12. The copolymer of claim 10, wherein said copolymer comprises from about 0.001 to about 2 mole percent unsaturated side chains.

13. The copolymer of claim 10, wherein said copolymer further includes a minor proportion of ethylene.

14. The copolymer of claim 10, wherein the diene comprises 1,9-decadiene.

15. The copolymer of claim 10, wherein said copolymer has a xylene-insoluble fraction of not more than 0.1 weight percent.

16. The copolymer of claim 10, wherein said copolymer has a branching index of from about 0.2 to about 0.9.

17. The unsaturated propylene/α,ω-diene copolymer of claim 6 wherein said copolymer has a branching index from about 0.6 to about 0.8.

18. The unsaturated propylene/α,ω-diene copolymer of claim 6 wherein said copolymer includes from about 0.1 to about 1 mole percent unsaturated side chains.

19. The copolymer of claim 10, wherein the copolymer is prepared by polymerization with a solid heterogeneous catalyst for stereoregular polymerization at a temperature below the crystalline melting point of the copolymer essentially in the absence of a solvent.

20. A propylene/decadiene copolymer, comprising:

propylene copolymerized with from 0.01 to 5 mole percent 1,9-decadiene, wherein the copolymer has less than 0.1 weight percent of xylene-insolubles, at least 80 weight percent heptane insolubles, and a branching index of about 0.2 to about 0.9, and wherein said propylene copolymer has from about 0.001 to about 2 mole percent unsaturated side chains.

21. The copolymer of claim 20, comprising from 0.01 to 2 mole percent total 1,9-decadiene.

22. The copolymer of claim 20, wherein the copolymer has a branching index of from about 0.6 to about 0.8.

23. The propylene decadiene copolymer of claim 20 wherein said copolymer includes from about 0.1 to about 1 mole percent unsaturated side chains.

24. A propylene copolymer comprising:

propylene copolymerized with 1,9-decadiene, wherein said 1,9-decadiene is present in said copolymer in the range of from about 0.1 to about 1 mole percent, wherein said propylene copolymer has:
 i) less than 0.1 weight percent xylene-insoluble fractions;
 ii) a branching index in the range of from about 0.6 to about 0.8;
 iii) in the range of from about 0.1 to about 1 mole percent unsaturated side chains; and
 iv) greater than about 80 weight percent heptane insolubles.

* * * * *

UNITED STATES PATENT AND TRADEMARK OFFICE
CERTIFICATE OF CORRECTION

PATENT NO. : 5,504,171
DATED : April 2, 1996
INVENTOR(S) : Etherton et al

It is certified that error appears in the above-indentified patent and that said Letters Patent is hereby corrected as shown below:

Col. 7, line 28, 6 should be Greek letter delta $\delta$.

Col. 8, line 45 should be $M_w/M_n$.

Signed and Sealed this

Fourteenth Day of January, 1997

*Attest:*

BRUCE LEHMAN

*Attesting Officer*  *Commissioner of Patents and Trademarks*